United States Patent
Hoffmeyer et al.

(10) Patent No.: US 9,609,744 B2
(45) Date of Patent: Mar. 28, 2017

(54) AREA ARRAY DEVICE CONNECTION STRUCTURES WITH COMPLIMENTARY WARP CHARACTERISTICS

(71) Applicant: International Business Machines Corporation, Armonk, NY (US)

(72) Inventors: Mark K. Hoffmeyer, Rochester, MN (US); Amanda E. Mikhail, Rochester, MN (US); Arvind K. Sinha, Los Alamos, NM (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 14/666,387

(22) Filed: Mar. 24, 2015

(65) Prior Publication Data
US 2015/0195901 A1    Jul. 9, 2015

Related U.S. Application Data

(62) Division of application No. 13/796,453, filed on Mar. 12, 2013, now Pat. No. 9,247,636.

(51) Int. Cl.
*G06F 17/50*    (2006.01)
*H05K 1/11*    (2006.01)
(Continued)

(52) U.S. Cl.
CPC ....... *H05K 1/0271* (2013.01); *G06F 17/5068* (2013.01); *G06F 17/5072* (2013.01);
(Continued)

(58) Field of Classification Search
CPC ............. G06F 17/5068; G06F 17/5072; G06F 17/5081; G06F 2217/12; G06F 2217/14;
(Continued)

(56) References Cited

U.S. PATENT DOCUMENTS

| 4,029,845 A | 6/1977 | Nomura |
| 5,282,312 A * | 2/1994 | DiStefano ........... H01L 21/4857 257/E23.173 |

(Continued)

FOREIGN PATENT DOCUMENTS

| JP | 201274530 A | 4/2012 |
| JP | 2012103785 A | 5/2012 |
| WO | 2010021287 A1 | 2/2010 |

OTHER PUBLICATIONS

Anonymous, "Estimating Asymmetric Layout in PCB Construction", IP.com Prior Art Database Technical Disclosure, IP.com No. IPCOM000218017D, published May 15, 2012, pp. 1-3.

(Continued)

*Primary Examiner* — Phallaka Kik
(74) *Attorney, Agent, or Firm* — Nicholas D. Bowman

(57) ABSTRACT

Printed circuit boards (PCBs) can be designed to have dynamic warp characteristics complimentary to those of an attached component. A PCB and an attached component can be designed to dynamically warp, during a thermal excursion, in the same direction and with approximately the same magnitude of warp. Warp characteristics of the PCB and the attached component can be determined by the vertical thickness of conductor and dielectric layers, by the wiring density and number of conductor layers. Warp characteristics can also be at least partially determined by the arrangement/ordering of conductor and dielectric layers, by dimensions of a sash structure surrounding a component outline and by dimensions of a prepreg layer applied to an existing design. Such a prepreg layer can cover a portion or an entirety of one of the PCBs planar surfaces.

14 Claims, 6 Drawing Sheets

(51) Int. Cl.
*H05K 3/00* (2006.01)
*H05K 1/02* (2006.01)
*H05K 3/34* (2006.01)
*H05K 1/18* (2006.01)
*G01R 31/26* (2014.01)

(52) U.S. Cl.
CPC ............ *G06F 17/5081* (2013.01); *H05K 1/11* (2013.01); *H05K 1/181* (2013.01); *H05K 3/3436* (2013.01); *G01R 31/26* (2013.01); *G06F 2217/12* (2013.01); *G06F 2217/14* (2013.01); *G06F 2217/38* (2013.01); *G06F 2217/40* (2013.01); *G06F 2217/80* (2013.01); *H05K 3/3494* (2013.01); *H05K 2201/09136* (2013.01); *H05K 2201/10734* (2013.01); *Y02P 70/613* (2015.11)

(58) Field of Classification Search
CPC ............ G06F 2217/38; G06F 2217/40; G06F 2217/80; H05K 1/0271; H05K 1/11; H05K 1/181; H05K 3/3436; H05K 3/3494; H05K 2201/09136; H05K 2201/10734; Y02P 70/613
USPC .............................. 716/137; 29/829; 361/760
See application file for complete search history.

(56) References Cited

U.S. PATENT DOCUMENTS

| | | | |
|---|---|---|---|
| 5,455,446 A | | 10/1995 | Suppelsa et al. |
| 5,637,382 A | | 6/1997 | Kataoka et al. |
| 5,900,312 A | * | 5/1999 | Sylvester ............... H01L 23/055 174/255 |
| 5,919,329 A | * | 7/1999 | Banks .................... H01L 21/486 156/281 |
| 6,143,432 A | | 11/2000 | de Rochemont et al. |
| 7,166,252 B2 | | 1/2007 | Gochnour et al. |
| 7,563,651 B2 | | 7/2009 | Kawata |
| 8,018,048 B2 | | 9/2011 | Tamaki |
| 2004/0017536 A1 | | 1/2004 | Takenaka |
| 2006/0167189 A1 | | 7/2006 | Mizuno et al. |
| 2007/0040282 A1 | | 2/2007 | Jung et al. |
| 2008/0048698 A1 | | 2/2008 | Amemiya et al. |
| 2011/0147895 A1 | | 6/2011 | Bai et al. |
| 2011/0176280 A1 | | 7/2011 | Lee |
| 2012/0081872 A1 | | 4/2012 | Brown et al. |
| 2012/0237751 A1 | | 9/2012 | Kotake et al. |
| 2013/0221505 A1 | * | 8/2013 | Furutani ........... H01L 23/49838 257/669 |

OTHER PUBLICATIONS

Vujosevic, M., "Thermally induced deformations in die-substrate assembly", Theoretical and Applied Mechanics, 2008., vol. 35, No. 1-3, pp. 305-322, Belgrade, 2008. DOI: 10.2298/TAM0803305V.

Hoffmeyer et al., "Area Array Device Connection Structures With Complimentary Warp Characteristics," U.S. Appl. No. 13/796,453, filed Mar. 12, 2013.

* cited by examiner

AREA ARRAY DEVICE CONNECTION STRUCTURES WITH COMPLIMENTARY WARP CHARACTERISTICS

TECHNICAL FIELD

The present disclosure relates to structures for attaching components to printed circuit (PC) boards. In particular, this disclosure relates to improved component to PC board connection reliability.

BACKGROUND

As integrated circuits (ICs) increase in complexity over time and include more active devices, the number of signals needed to connect an IC to other components in an electronic system increases. More complex ICs often consume increasing amounts of power, which in turn also requires a larger number of electrical connection points on the IC to adequately supply current.

Ball grid array (BGA) electronic packages are often used to connect IC die to a printed circuit (PC) board. BGA packages are used to interconnect both signals and power between the PC board and the IC die, through an arrangement of solder ball connections at the interface between the BGA package and the PC board. The need for increasing numbers of connections to complex ICs has caused an increase in the interface areas of both the BGA package and the PC board, in order to provide more BGA ball connection sites.

Electrical signal connections to ICs through electronic packages are typically not redundant, so each signal connection from the IC to a PC board (or other connecting structure) is essential for the IC's intended operation. A faulty signal connection, in the form of an open, a short, or an intermittent can cause an IC to catastrophically malfunction. The reliability of IC interconnections to PC boards and other structures is therefore critically important to ensure the proper function of the IC in an electronic system.

SUMMARY

One embodiment is directed to a method for designing component attachment structures with complimentary dynamic warp characteristics for attachment of a first component in a first locality on a PC board. The method includes determining the warp characteristics (including magnitude and direction of warp) of thermally induced dynamic warp of the PC board and of the first component. The method also includes analyzing and comparing differences between the dynamic warp characteristics of the PC board and the first component and selecting design modifications to match the dynamic warp characteristics of the PC board and the first component. Selecting design modifications may include determining if the first component dynamic warp characteristics can be changed, determining if matching the dynamic warp characteristics of the PC board and the first component can be achieved by modifying the design of at least one of the PC board and the first component. The method also includes selecting design characteristics of at least one of the PC board and the first component to modify, and modifying the design of at least one of the PC board and the first component. The result of the method may be modified dynamic warp characteristics of at least one of the PC board and the first component.

Another embodiment is directed to an electrical assembly of a PC board and an attached component. During a thermal excursion, the PC board and component may dynamically warp in the same direction, with approximately the same magnitude of warp.

Aspects of the various embodiments may provide increased reliability of electrical connections in assemblies of PC boards and components.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of embodiments of the invention and do not limit the invention.

In the drawings and the Detailed Description, like numbers generally refer to like components, parts, steps, and processes.

DETAILED DESCRIPTION

Figure 1A:
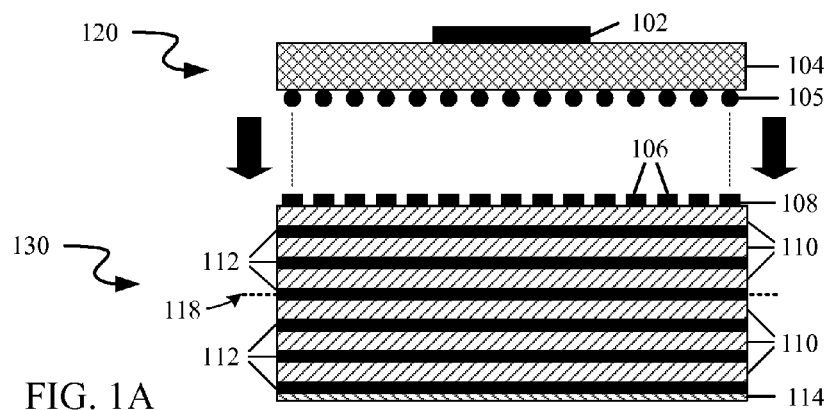
FIGS. 1A, 1B and 1C depict cross-sectional views of a component and PC board through three steps of a reflow process.

In general, the embodiments describe a method for determining, analyzing, and modifying warp characteristics of a component and a PC board that may provide increased soldered connection reliability. An electronic system according to the invention may have improved reliability over a range of operating conditions including temperature.

For the purposes of discussion, a "component" may be an electronic package that includes a planar array of connection points used to make connections to a corresponding area on a PC board. Connecting structures are used to create connections that are both electrical and mechanical between the component and PC board. Connecting structures may include BGA solder balls, land-grid array (LGA) structures, hybrid LGA (HLGA) structures, solder columns, and other mechanical interconnects such as springs, pogo-pins, or elastomeric materials. A component may also comprise a connector or socket element that makes use of the above connecting structures. It is understood that the principles of the invention may apply to a wide range of types of components.

The particular types of electronic components relevant to the embodiments are known as "area array devices", and include a dense array of conductive sites on a substantially planar surface designed to mate with a corresponding set of sites on a PC board or other structure. This type of component often includes a laminate substrate which provides one substantially planar surface for the purpose of active or passive electronic device attachment, and the opposite substantially planar surface for the array of mating conductive sites. A substantially planar surface is planar within the normal process tolerances of semiconductor package and PC board processing facilities. An exemplary flatness specification may be 0.004 inches (4 mils) on a device 2 inches or larger per side, however this may vary depending on manufacturing methods and connection type(s).

A ball grid array (BGA) substrate is a type of area array device (package) used in conjunction with complex ICs, which may provide a large number and high density of electrical connections. Multiple electrical and mechanical connections are formed between the BGA substrate and PC board by partially melting (reflowing) solder balls previously attached to metal pads on the substrate. BGA packages with over 2,000 solder balls connections are commercially available and larger packages are contemplated.

Increasingly complex integrated circuits (ICs or chips) require greater numbers of electrical connections on the chip packages they are mounted on in order to meet the IC's signal IO and power needs. A chip package acts as an intermediate electrically conductive layer between the chip and the PC board and provides multiple electrical attachment points for connection to a PC board. A chip package is one example of a component.

A PC board is generally understood to be a rigid planar laminate structure comprised of one or more insulating or dielectric layers, and one or more conductive layers, which provides one or more surfaces on which to mount electronic components, and a means to interconnect the components. For the purposes of discussion and illustration, the above definition of a PC board will be used, however, embodiments of the invention may employ another type of rigid structure in place of a PC board. Such structures may include but are not limited to connectors, component sockets, and interposers.

The characteristics of a PC board or other structure that apply to the embodiments are rigidity and at least one planar surface which contains an array of contact sites which form a mating pattern to those found on the opposing surface of a component. The contact sites are used to make electrical and mechanical connections to the component.

The footprint dimensions of large ball-count BGA packages may be greater than 50 mm×50 mm. Solder balls attached to BGA substrates have a generally spherical shape prior to a reflow operation. An industry trend of decreasing solder ball diameter to accommodate smaller solder ball pitches has resulted over time in decreasing spacing between the BGA module and the PC board.

The BGA interface area on both the BGA package and the PC board are planar, and the trend of decreasing spacing between them has made the BGA to PC board interface very susceptible to defects caused by planar deviations such as warp. Even a slight amount of warp mismatch between the component and the PC board may result in defects in the BGA ball interfaces, which are essential in providing stable electrical and mechanical connections between the module and PC board.

Electronic packages and PC boards are typically constructed from a laminate of materials which may include various conductor and dielectric layers, each material type having its own unique coefficient of thermal expansion (CTE). When heated, each material type may expand at a different rate, causing warp of the component or PC board.

Figure 6A:
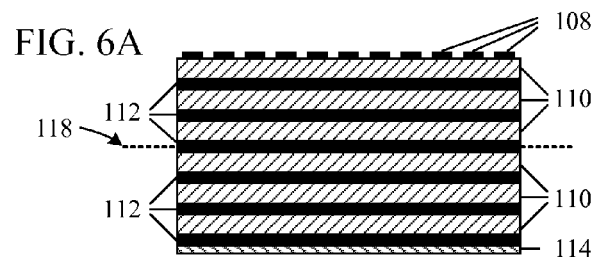
FIG. 6A through 6I depict cross-sectional views of PC board, illustrating design changes to alter warp characteristics, according to embodiments of the invention.

A preferred design methodology for electronic packages and PC boards involves using a vertical arrangement of conductor and dielectric layers (stackup) that is symmetrical about an axis drawn through the center of a cross section of the laminate layers, and parallel to the layers. FIG. 6A illustrates an essentially symmetrical laminate cross section, including axis of symmetry 118, conductor layers 112, dielectric layers 110, solder mask coating 114, and BGA connection pads 108. These features will be described in detail with reference to FIG. 6A. Aspects of the symmetry include the number, arrangement, thicknesses and types of layers on each side of the axis of symmetry.

A symmetrical stackup may minimize or eliminate warping of the PC board or package during assembly operations involving temperature excursions, such as a reflow process. Design or manufacturing constraints however may prohibit the stackup from being entirely symmetrical, and some warping of either the PC board, the component, or both may occur as a result.

Warp has two important attributes; phase (or direction) and magnitude. Warp phase refers to the direction (upwards or downwards from a reference plane) of the PC board or component deflection. Warp magnitude 212 (FIG. 2B) is defined as the largest vertical component or PC board deflection that can be measured relative to a reference plane, often a flat surface. Warp magnitude is measured within the field of BGA connection pads 108 (FIG. 2A) on the PC board or package surface.

Figure 2A:
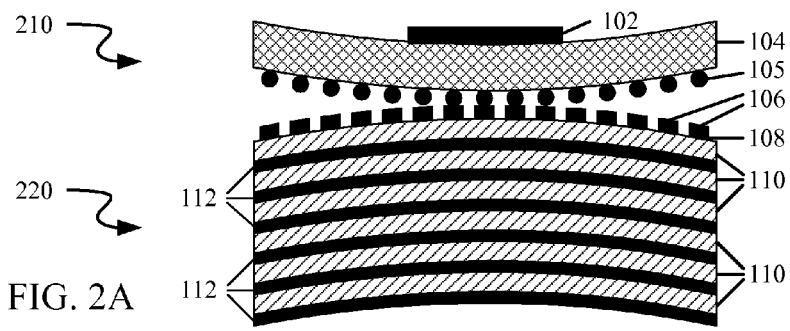
FIGS. 2A, 2B and 2C depict cross-sectional views of a component and PC board, illustrating three combinations of BGA and PC board warp.
Figure 2B:
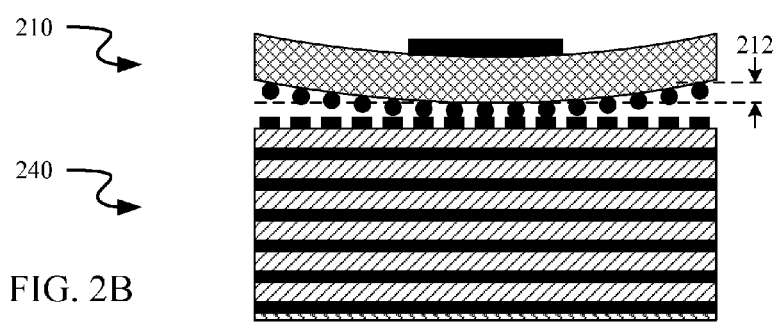
Figure 2C:
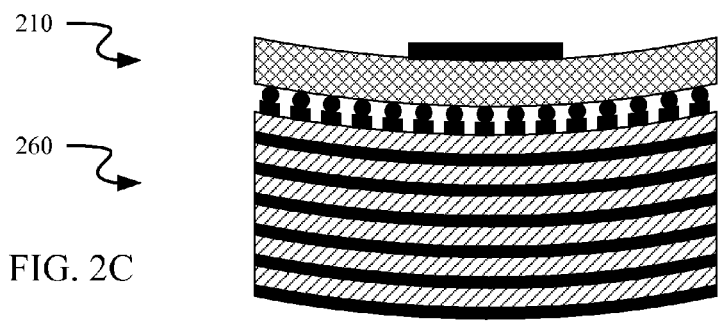

Dynamic (thermally induced) warp is the deformation of a component (chip package) or a PC board as it experiences a thermal excursion, for example during a reflow process. A PC board or component may have a certain cross-sectional profile at room temperature, then deflect (movement of edges and/or surfaces) a certain amount either upwards (concave) or downwards (convex) during heating, then return to the original profile once it returns to room temperature. Concave deflection has a positive $2^{nd}$ derivative as seen from a side view, such as a "cup" shape. Convex deflection has a negative $2^{nd}$ derivative as seen from a side view, such as a "cap" shape. Referring now to FIG. 2A, 2B, 2C, BGA module 210 depicts concave warp, and PC board 220 illustrates convex warp. Dynamic warp may be exacerbated by larger component footprints and PC board mounting areas.

If the dynamic warp of a PC board and a component being attached to it during a reflow operation are different (mismatched) in phase or magnitude, a number of types of BGA reflow defects may occur which may later result in mechanical or electrical failures. Defects may occur when one or more solder balls on the BGA substrate separate from the solder paste during a reflow operation, due to mismatch between the PC board and substrate dynamic warp characteristics. Exemplary warp magnitudes of a component may be between 0.254 mm and 0.508 mm, though higher magnitudes are possible. An exemplary maximum permissible package warpage may range from 0.10 mm to 0.25 mm, depending on solder ball size and manufacturing process used.

One type of defect, known as a "head-in-pillow" defect occurs when BGA substrate solder balls are separated from the solder paste on the PC board during the reflow process, due to dynamic warp mismatch. Solder paste typically contains flux, a chemical agent to clean and prevent oxidation of mating metallic surfaces during the reflow process. When the solder ball is separated from contact with the solder paste during the heating of a reflow operation, the lack of flux may allow an oxide layer may be grown on the outer surface of the solder ball. This oxide layer may subsequently prevent proper bonding of the solder ball to the solder paste, resulting in a defective (weak) mechanical connection.

Defects such as the head-in-pillow type may manifest themselves immediately, as an intermittent or open, or may be latent, only appearing after some period of thermal cycling of the component and PC board. Because a head-in-pillow may initially appear as a valid connection, it may not be easily detected using classical test methods. The latent failure of a single BGA connection may result in catastrophic system failure, as every signal connection is critically important to many electronic systems.

A material's coefficient of thermal expansion (CTE) is defined as the change of unit length per change in unit temperature for that type of material. A commonly used unit of measure for CTE is parts-per-million per degree Celsius (ppm/° C.). A material may expand or contract linearly in proportion to the CTE times the change in temperature experienced. A larger CTE indicates a greater material expansion than a smaller CTE, for an identical temperature excursion. The dynamic warp of a component or PC board is largely dependant on the CTEs, dimensions, and arrangement of the various materials comprising its laminate structure. Dynamic warp and dynamic warp mismatch may also be influenced by temperature gradients across a component or PC board, due to uneven heating during a reflow operation.

The table below lists some representative materials used in the fabrication of electronic packages and PC boards. The coefficient of thermal expansion (CTE) ranges and values shown are intended to be exemplary, and are understood to not be limiting. One skilled in the art of PC board and electronic package design will understand that a large number of material types are available for use, each having a specific CTE range.

TABLE 1

| Material Name | Usage | CTE range (ppm/° C.) |
| --- | --- | --- |
| Silicon die | Active electronic circuits | 2.3 |
| Unfilled Polymer | Chip encapsulant | 10-25 |
| Lead-free solder | BGA solder ball | 19-23 |
| Tin/lead solder | BGA solder ball | 21 |
| Copper | PC board signal and power interconnection | 17-18 |
| FR-4 | PC board base material (epoxy resin + glass) | 13-14 |

For simplicity of illustration, the following figures depict a BGA component and its relationship to an exemplary PC board; however, the principles of the invention may be applied to other types of components and PC boards or other rigid structures.

Figure 1B:
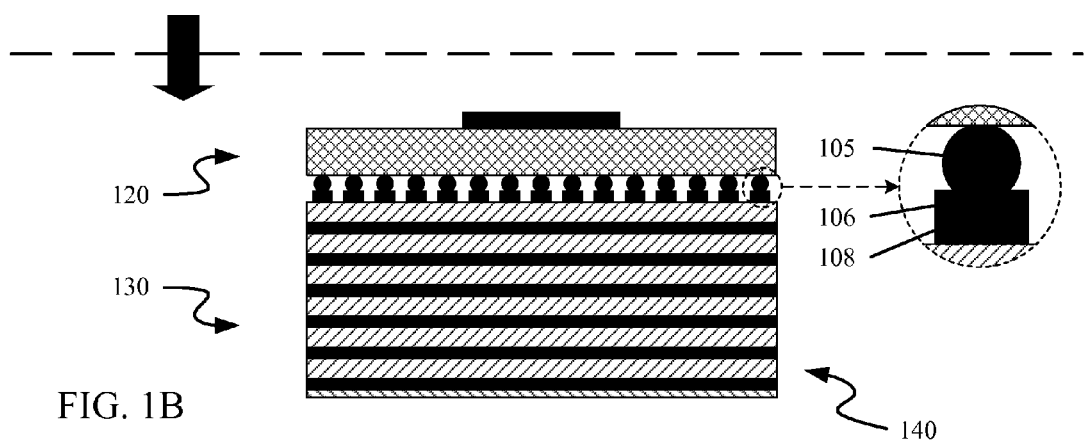
Figure 1C:
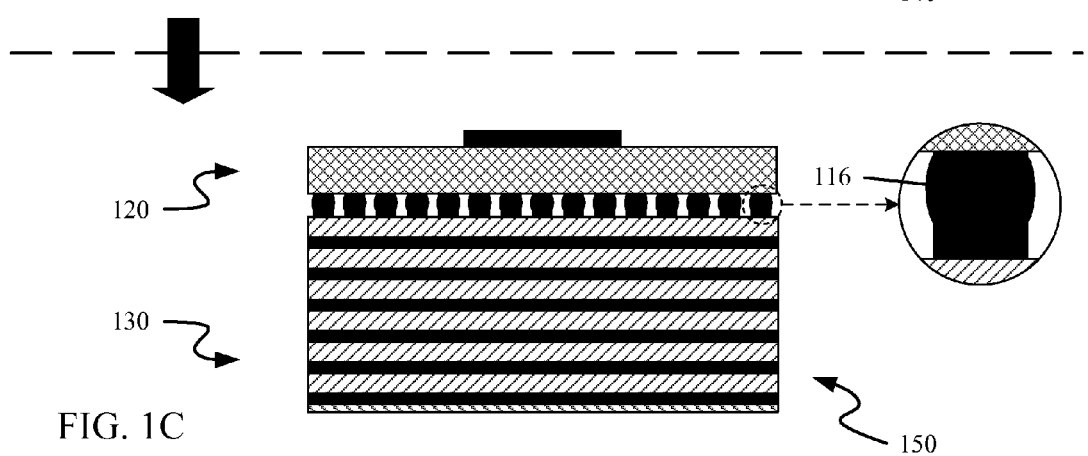

FIGS. 1A, 1B and 1C are cross-sectional views of a BGA component 120 and a PC board 130 depicting three consecutive steps of a reflow process. It should be noted that a reflow process devoid of any component or PC board warp is depicted, which though desirable, may not necessarily be achievable in practice.

FIG. 1A includes the BGA component 120 which is comprised of a chip 102, a substrate 104, and solder balls 105. The solder balls 105 are attached to the substrate 104 and are arranged in a regular array on the lower planar surface of the substrate 104. The substrate 104 provides multiple electrical connections (not shown) between the chip 102 and the solder balls 105.

FIG. 1A also includes the PC board 130, which is comprised of a laminate of alternating dielectric layers 110 and conductor layers 112. BGA connection pads 108 are formed on the top surface of the PC board 130, and a layer of solder paste 106 is deposited on each of the BGA connection pads 108. The lower planar surface of the PC board 130 is covered by a solder mask coating 114 to protect surface metallization during its assembly and from oxidation and damage.

FIG. 1A illustrates the BGA component 120 aligned with the PC board 130 so that the array of solder balls 105 is vertically aligned with and opposes the array of BGA connection pads 108 below it. This alignment is often performed by automated machinery, which then lowers the BGA component 120 onto the PC board 130.

FIG. 1B illustrates the BGA component 120 placed on the PC board 130 so that the array of solder balls 105 is both aligned with the array of BGA connection pads 108 below it, and impressed into the solder paste 106 on top of the connection pads 108 (see inset drawing for magnified view). FIG. 1B depicts the component 120 and PC board 130 combined into a pre-reflow assembly 140, ready for a reflow operation.

The pre-reflow assembly 140 is subsequently exposed to a heat source such as a reflow oven, where the temperature of the assembly 140 is carefully controlled and monitored over time. (See FIG. 3). The purpose of heating the assembly 140 is to melt and fuse the solder of the solder balls 105 with the solder paste 106, which simultaneously attaches to the connection pads 108.

FIG. 1C shows the reflowed assembly 150, after the reflow operation (elevating then subsequently lowering assembly temperature) is completed. The solder balls 105 and solder paste 106 have melted together to form a barrel-shaped reflowed BGA ball 116, which is securely attached to both substrate 104 and BGA connection pads 108. It should be noted that in this illustration, featuring both a planar BGA component 120 and PC board 130, that all the reflowed BGA balls 116 are similar in shape and dimensions, and all form stable connections between their respective sites on the substrate 104 and BGA connection pads 108. The reflowed assembly 150 contains no BGA connection electrical defects, such as shorts, opens, or intermittent connections caused by warpage.

PC board 130 has the same number of conductor layers 112 (including BGA connection pads 108) and dielectric layers 110 on either side of the axis of symmetry 118. The conductor layers 112 are all the same thickness, and the dielectric layers 110 are all the same thickness. The layer arrangement shown represents a desirable, symmetric configuration that may minimize warp when the PC board is heated.

FIGS. 2A, 2B and 2C are cross-sectional views illustrating three types of warp relationships between a BGA component 210 and PC boards 220, 240, and 260. FIGS. 2A, 2B and 2C are exemplary illustrations only; many other combinations of warp relationships between components and PC boards are possible, including a large variety of warp phase and magnitude combinations.

It should be noted that FIGS. 2A, 2B and 2C are static illustrations of the warp of a BGA substrate and a mating PC board. These illustrations may depict the warp characteristics at a certain temperature, but those characteristics, including phase and magnitude may vary as the temperature of the substrate and the PC board changes.

FIG. 2A depicts a BGA component 210 and a PC board 220 with warp that is out of phase; the BGA component 210 edges deflect upwards, while the PC board 220 edges deflect downwards. The difference in warp phase may cause separation of the solder balls 105 and the solder paste 106, which may create a defect in certain solder ball connections during a reflow operation.

Similarly, FIG. 2B depicts a BGA component 210 and a PC board 240 with warp that is out of phase; the BGA component 210 edges deflect upwards, while the PC board 240 edges do not deflect. The difference in warp phase may cause separation of the solder balls 105 and the solder paste 106, which may create a defect in certain solder ball connections during a reflow operation.

FIG. 2C depicts a BGA component 210 and a PC board 260 with warp that is in phase. BGA component 210 edges deflect upwards in the same direction and with the same magnitude as the edges of PC board 260. The type of warp relationship between a PC board and a component with the same warp phase and magnitude (within normal manufacturing tolerances) over a temperature excursion is known as complimentary dynamic warp. The identical warp phase and similar magnitude does not cause separation of the solder balls 105 and the solder paste 106, which may help to ensure stable, defect-free solder ball connections during a reflow operation. The warp characteristics (magnitude and phase) of both the BGA component 210 and PC board 260 must remain within manufacturing tolerances during the entire reflow operation (temperature excursion—see FIG. 3) in order to ensure defect-free connections.

Figure 3:
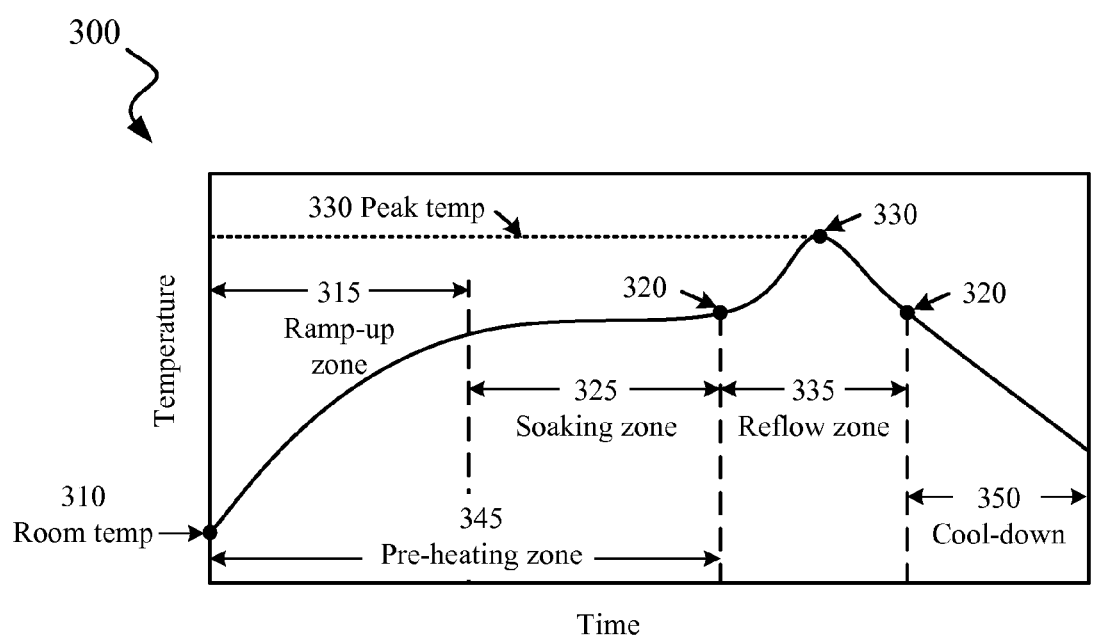
FIG. 3 is a graph illustrating an exemplary BGA reflow temperature profile.

FIG. 3 is a graph illustrating a BGA reflow temperature profile during an exemplary reflow operation. The graph depicts the temperature of the solder ball and solder paste interface between the BGA substrate and the PC board. During the reflow operation, the temperature of the profile is typically precisely controlled and monitored in a reflow oven. Heat may be applied to the substrate and PC board through convection, forced hot air or other gasses, infrared heating elements, vapor phase heating, or other means. The temperature excursion of a reflow process (difference between peak temperature 330 and room temperature 310) is typically greater than 200 degrees C., but may vary depending on the specific solder alloy compositions of the solder balls 105 and solder paste 106.

The temperature profile is divided up into several zones, each having a unique purpose. During the ramp-up zone 315, the component and PC board temperature is rapidly raised from room temperature 310 to a temperature that approximates a soaking temperature 320. The temperature rise may be uneven across the PC board and component due to the method(s) of heating, the specific heat of each material, and other factors, and during the ramp-up zone 315 may cause differences in warp magnitude between them.

A soaking zone 325 allows time for the PC board and component temperatures to stabilize and equalize. The preheating zone 345 comprises the ramp-up zone 315 and the soaking zone 325. During the reflow zone 335, the solder ball and solder paste is raised to the peak temperature 330, at which the paste and solder ball merge, and wet the surfaces of the BGA connection pads 108 on the PC board. The temperature then returns to the soaking temperature 320. During the cool-down zone 350 the solder temperature begins to return from the soaking temperature 320 to room temperature 310.

Figure 4:
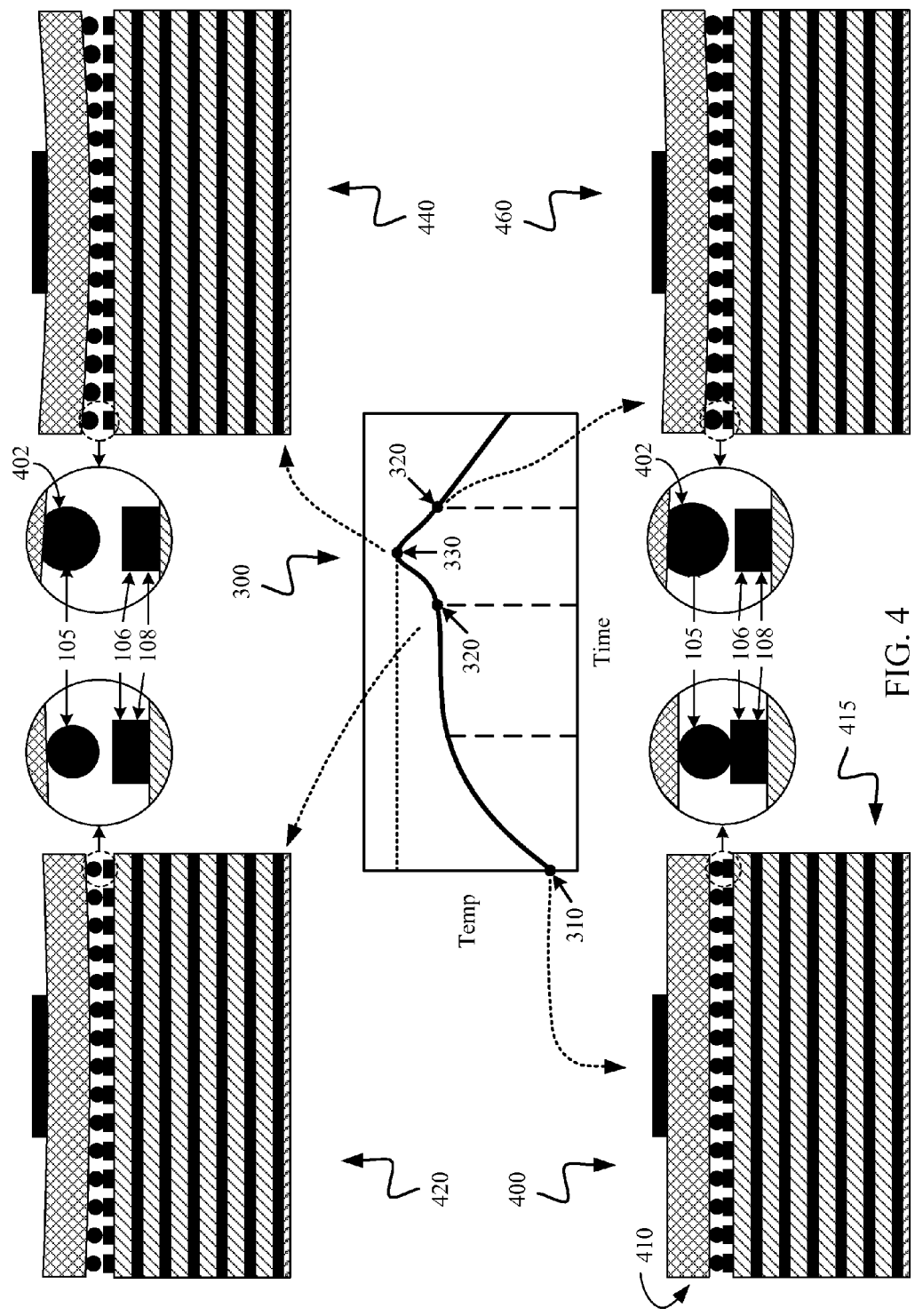
FIG. 4 is a diagram depicting the warp of a BGA package at various points along the BGA reflow temperature profile of FIG. 3.

FIG. 4 is a diagram depicting the warp of an exemplary BGA substrate 410 at various points along the BGA reflow temperature profile of FIG. 3. FIG. 4 also illustrates how a type of defect may be created by mismatched dynamic warp characteristics of a BGA substrate and a PC board. For ease of illustration, FIG. 4 depicts dynamic warp of just a BGA substrate 410; the PC board is shown with no dynamic warp.

Warp combinations may include any combination of magnitude and phase differences, some of which are depicted in FIG. 3.

Starting at room temperature 310, assembly 400 depicts the BGA substrate 410 and PC board 415 interface. The inset diagram shows a solder ball 105 impressed into and aligned with areas of solder paste 106, similar to FIG. 1B. All solder balls on the BGA are similarly impressed into and aligned with areas of solder paste 106.

Assembly 420 depicts the and PC board 415 interface as the solder ball 105 and solder paste 106 temperature are raised to the final soaking temperature 320. The inset diagram shows solder ball 105 separated from an area of solder paste 106, due to differences in dynamic warp of the BGA substrate 410 and the PC board 415. The increase in temperature from room temperature 310 to final soaking temperature 320 has caused the BGA substrate 410 to deflect more than the PC board 415, causing the separation on the solder balls 105 at the edge of the BGA substrate 410.

As the interface temperature is further raised to the peak reflow temperature 330, assembly 440 depicts the BGA substrate 410 and PC board 415 interface. The inset diagram shows a solder ball 105 further separated from an area of solder paste 106. A BGA ball oxide layer 402 has begun to form on surface of the solder ball 105. If the solder ball 105 remained impressed into the solder paste 106, the flux present in the solder paste would chemically prevent oxide from forming, allowing the solder ball 105 and solder paste 106 to melt together in response to the applied heat. Both the separation of the solder ball 105 and solder paste 106 and the BGA ball oxide layer 402 may now prevent a proper reflow process.

As the temperature decreases from the peak reflow temperature 330 to the post-reflow temperature 320, assembly 460 depicts the BGA ball oxide layer 402 growing thicker, while the BGA substrate 410 warp decreases, moving solder ball 105 closer to solder paste 106. As the temperature continues to decrease, the BGA substrate 410 continues to deflect downwards, eventually bringing the surface of BGA ball oxide layer 402 in contact with an area of solder paste 106. By the time the BGA ball oxide layer 402 is in contact with an area of solder paste 106, the flux that was contained in the solder paste has been consumed in cleaning the micro-spheres of solder in the solder paste 106, and not enough remains to remove the BGA ball oxide layer 402, and allow the solder paste 106 and the solder ball 105 to properly melt together.

Again referring to assembly 460, the solder ball 105 (with oxide layer) may be pressed into the solder paste 106, but may create an open connection, or a very weak electrical connection due to the electrically insulating nature of the oxide. This type of defect is known as a "head-in-pillow" defect, and may be very difficult to detect using traditional test methods. A head-in-pillow defect is one type of a cold solder joint defect. Other defect types such as shorts, opens, and other forms of intermittent connections are also possible as a result of component and PC board warp mismatch. The above listed defect types may manifest themselves immediately, or at some point in time after the reflow operation.

Figure 5:
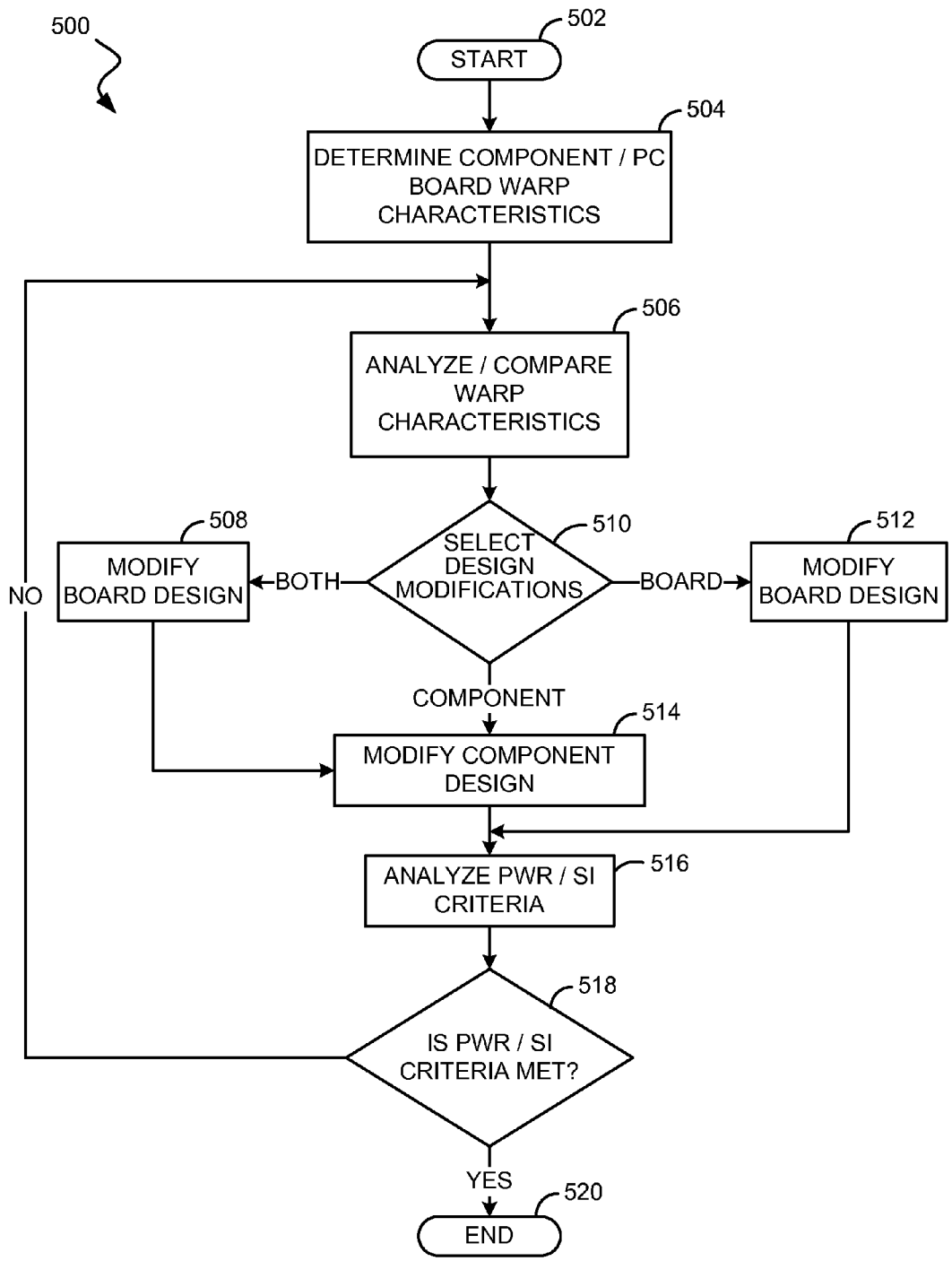
FIG. 5 is a flow diagram illustrating determining, analyzing, selecting and modifying warp characteristics to create design structures with complimentary warp characteristics, according to embodiments of the invention.

FIG. 5 is a flow diagram that illustrates determining, analyzing, selecting and modifying PC board and component warp characteristics to create design structures with complimentary dynamic warp characteristics, according to embodiments of the invention. While PC board manufacturing tolerances (values) may vary by technology, they are specified to ensure consistent contact between mating parts of a reflow connection throughout a reflow operation.

A desirable outcome of modifying (tuning) components and PC boards to produce complimentary dynamic warp is contact between solder balls on a BGA package and corresponding solder paste on a PC board throughout a reflow process (FIG. 3). The continuity of contact that complimentary dynamic warp may produce may create more reliable BGA reflow connections, and thus more reliable IC operation in electronic systems. Defects such as head-in-pillow, opens and shorts may be reduced or eliminated. FIG. 1C and FIG. 2C. depict exemplary complimentary dynamic warp characteristics at two different temperatures of a reflow profile, such as FIG. 3.

The process 500 moves from start 502 to determine warp characteristics 504. At determine warp characteristics 504, the initial (before modifications) dynamic warp characteristics of the component and the PC board are ascertained. Warp data regarding phase, magnitude, and other characteristics may be gathered from any combination of measurements, component or PC board supplier specifications, software modeling results, or other sources. Warp measurement methods may include the shadow moiré method, the laser reflection method, or X-ray imagery. Component or PC board supplier specifications may include a table of warp values over a range of reflow profile temperatures. The warp characteristics of each individual component and PC board mounting site are determined.

After warp characteristics are determined (operation 504) magnitudes and phases of the component and PC board warp are analyzed and compared to each other (operation 506), and differences between them are determined.

The results of operation 506 are then used as a basis of the selection operation 510, which determines whether the component, the PC board, or both should be modified, and which types of modifications are to be made. Operation 510 may use historical recorded warp characteristics and thermomechanical warp simulation results from operations 504 and 506 to determine which design modifications will provide appropriate complimentary dynamic warp between the component and the PC board.

Types of design modifications may include any combination of altering the vertical thickness of conductor or dielectric layers, the number or arrangement of conductor or dielectric layers, the types of materials used and wiring density. The above listed design modifications are further illustrated in FIG. 6A through FIG. 6I.

The selection of operation 510 may include determining the economic feasibility of modifying the component's warp characteristics. The component may manufactured by a company that is unwilling to change its warp characteristics, or it may be prohibitively difficult or expensive to do so.

Again referring to selection operation 510, if only PC board modifications are chosen, the board design data and material types may be modified in operation 512. If only component modifications are chosen, the component design data and material types may be modified in operation 514. If both board and component modifications are chosen, then operations 508 and 514 are both performed, modifying the design data and material types of both the PC board and component.

Operations 508, 512, and 514 may include modifying design data that is stored in electronic design automation (EDA) programs, as well as specifying various materials with CTEs suitable for the construction of one or more of the PC board and the component. Design data may include but is not limited to wiring shapes that define material placement, material types and dimensions, and stackup configurations.

Once all board and component design modifications are completed (operations 508, 512, and 514), the board and component are analyzed for signal integrity (SI) and power structure robustness in operation 516. SI and power distribution analysis may employ commercially available circuit analysis software. The analysis of 516 may be necessary because modifying the design data, including wiring, material types and dimensions, and layer arrangement may adversely affect the electrical properties of the design, and create unforeseen functional problems. If power distribution or SI criteria are not met, as determined in deciding operation 518, then the process 500 may need to be repeated starting at operation 506, where the warp characteristics of the modified PC board are re-analyzed and compared against each other. Adjustments may be made in select operation 510 to balance the needs of warp adjustment against SI and power distribution criteria. If power distribution and SI criteria are met, then the process 500 may end at block 520.

It is noted that the process depicted by FIG. 5 may be applied to multiple component attachment sites on a PC board with each interface area independently adjusted to create complimentary dynamic warp characterizes for that interface. PC board modifications are not strictly limited to the area underneath a component, but may be larger or smaller than the component attach area.

FIG. 6A through 6I depict cross-sectional views of a PC board, illustrating design changes that may alter dynamic warp characteristics, according to embodiments of the invention. Similar changes may be made to the structure of an electronic component or component substrate. The changes illustrated are exemplary embodiments that reference typical materials properties shown in Table 1, and do not limit the invention in any way. Actual practice of the invention may use any combination of the changes illustrated in FIG. 6A through 6I and other suitable types of design modifications or material types.

FIG. 6A represents a cross-sectional view of an unmodified PC board, having six conductor layers 112, six dielectric layers 110, BGA connection pads 108 and solder mask coating 114. The above listed features of FIG. 6A are present in FIG. 6B through 6I, except where noted. FIG. 6A depicts an exemplary PC board cross-section that is largely symmetrical across the axis of symmetry 118, and exhibits minimal dynamic warp in response to temperature excursions.

All changes depicted in FIG. 6B through 6I are in reference to the axis of symmetry 118, and are relative to FIG. 6A. Design changes generally involve changing the overall CTE of the portion of the laminate structure on one side of the axis of symmetry 118, to promote warping either upwards (concave) or downwards (convex) during a reflow process. The relative thickness of a laminate material and the material's CTE (See Table 1) both influence the amount of dynamic expansion and warp produced by that material In general, any changes described or depicted in relation to FIG. 6B through 6I may be migrated across the axis of symmetry 118 to produce dynamic warp in an opposite direction (phase).

Figure 6B:
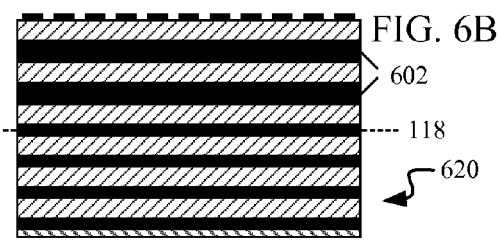

FIG. 6B shows the replacement of two conductor layers 112 above the axis of symmetry 118 with two thicker conductor layers 602. This may cause downward dynamic warp of the edges of PC board 620.

Figure 6F:
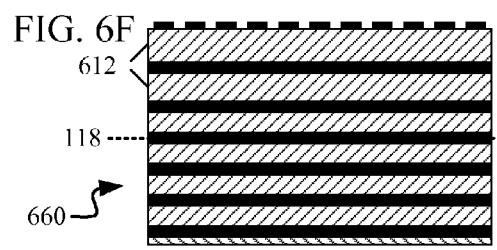
Figure 6C:
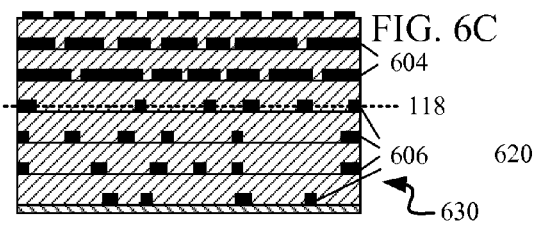

FIG. 6C shows conductor layers 112 above the axis of symmetry 118 with a higher wiring density (ratio of wire to dielectric area on a conductor layer) than conductor layers 112 below the axis of symmetry 118. This may cause downward dynamic warp of the edges of PC board 630.

Figure 6G:
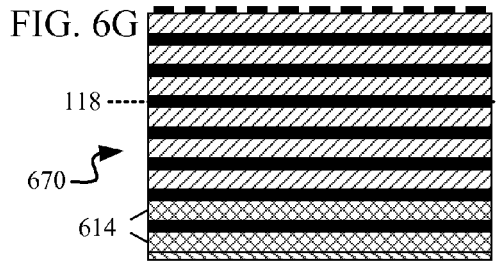
Figure 6D:
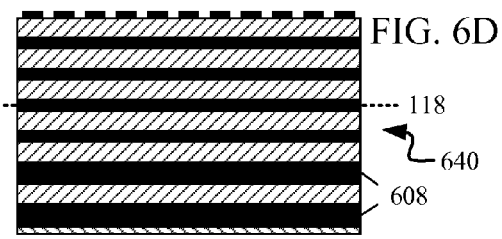

FIG. 6D shows the replacement of two conductor layers 112 below the axis of symmetry 118 with two thicker conductor layers 608. This may cause upward dynamic warp of the edges of PC board 640.

Figure 6H:
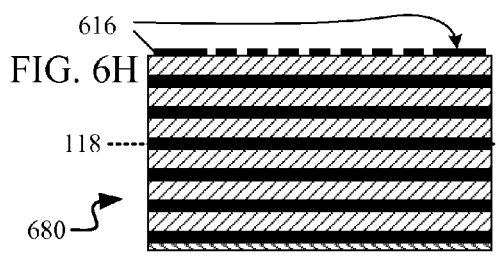
Figure 6E:
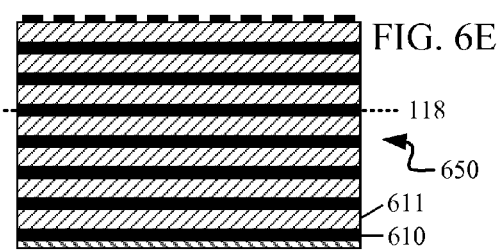

FIG. 6E shows additional conductor layer 610 and additional dielectric layer 611 below the axis of symmetry 118. As depicted, this may not change the dynamic warp of the edges of PC board 650, but may influence the overall warp of the PC board 650 depending on the particular arrangement, thickness, and CTEs of other conductor and dielectric layers above it.

FIG. 6F shows the replacement of two dielectric layers 110 above the axis of symmetry 118 with two thicker dielectric layers 612. This may cause upward dynamic warp of the edges of PC board 660.

FIG. 6G shows two additional dielectric layers 614 and additional conductor layers 112 below the axis of symmetry 118. The additional dielectric layers 614 have a different CTE than other dielectric layers 110, and the additional conductor layers 112 have a CTE that is identical to other conductor layers 112. If the CTE of the additional dielectric layers 614 is greater than the CTE of dielectric layers 110, this may cause upward dynamic warp of the edges of PC board 670. If the CTE of the additional dielectric layers 614 is less than the CTE of other dielectric layers 110, this may cause downward dynamic warp of the edges of PC board 670.

FIG. 6H shows the addition of a sash structure 616 (comprised of copper) surrounding BGA connection pads 108 on the top of PC board 680, which may cause downward dynamic warp of the edges of PC board 680. Sash may be added to either the top or bottom surface of a PC board, as needed.

Figure 6I:
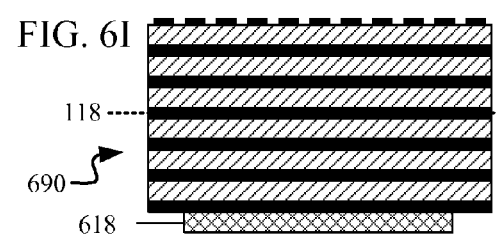

FIG. 6I shows the addition of partial pre-preg patch 618 to the bottom of PC board 690. Pre-preg is typically a partially cured, glass-free epoxide sheet used for bonding printed circuit board layers. Embodiments may include using a partial patch, which corresponds to a part or the entirety of the field of BGA connection pads 108. Other embodiments may include using a full patch that covers the entire lower surface of the PC board 690. Since the CTE of pre-preg materials are typically greater than the overall CTE of the other layers of PC board 690, the pre-preg patch 618 may cause upward dynamic warp of the edges of PC board 690. However, if the pre-preg patch 618 were to have a CTE less than the overall CTE of the other layers of PC board 690, it may cause downward dynamic warp of the edges of PC board 690.

Although the present invention has been described in terms of specific embodiments, it is anticipated that alterations and modifications thereof may become apparent to those skilled in the art. Therefore, it is intended that the following claims be interpreted as covering all such alterations and modifications as fall within the true spirit and scope of the invention.

What is claimed is:

1. An electrical assembly comprising a printed circuit board (PCB) and an attached component, the PCB and the attached component configured to dynamically warp, during a thermal excursion, in the same direction and with approximately the same magnitude of warp, the dynamic warp characteristics of at least one of the PCB and the attached component at least partially determined by electrical assembly characteristics including a vertical thickness of a conductor layer, a number of conductor layers, a vertical thickness of a dielectric layer and an arrangement of conductor and dielectric layers.

2. The electrical assembly of claim 1, further comprising a second attached component wherein, during the thermal excursion, the PCB and the second attached component dynamically warp in a same direction, with approximately a same magnitude of warp.

3. The electrical assembly of claim 1, wherein dynamic warp characteristics of at least one of the PCB and the attached component are at least partially determined by a wiring density of a conductor layer.

4. The electrical assembly of claim 1, wherein dynamic warp characteristics of at least one of the PCB and the attached component are at least partially determined by dimensions of a sash structure surrounding a component outline on an outer layer of the PCB.

5. The electrical assembly of claim 1, wherein dynamic warp characteristics of at least one of the PCB and the attached component are at least partially determined by dimensions of a prepreg layer applied to an existing design, the prepreg layer including a reinforcing fabric pre-impregnated with a resin compound, the prepreg layer covering an entirety of one the PCB's planar surfaces.

6. The electrical assembly of claim 1, wherein dynamic warp characteristics of at least one of the PCB and the attached component are at least partially determined by dimensions of a prepreg layer applied to an existing design, the prepreg layer including a reinforcing fabric pre-impregnated with a resin compound, the prepreg layer covering a portion of one the PCB's planar surfaces.

7. The electrical assembly of claim 1, wherein dynamic warp characteristics of at least one of the PCB and the attached component are at least partially determined by constituent materials with physical properties suitable for at least partially determining the dynamic warp characteristics of at least one of the PCB and the attached component.

8. The electrical assembly of claim 7, wherein a constituent material's physical property suitable for modifying warp characteristics is a coefficient of thermal expansion (CTE) of the constituent material.

9. The electrical assembly of claim 7, wherein a constituent material with physical properties suitable for modifying the warp characteristics of at least one of the PCB and the attached component is one of a prepreg material, an epoxy material and a conductor material.

10. The electrical assembly of claim 1, further comprising component attachment structures, to attach the component to the PCB, the component attachment structures including two opposing substantially planar surfaces with a set of contact points on each surface arranged to be electrically connected with contact devices.

11. The electrical assembly of claim 10, wherein types of contact devices include at least one of solder balls, solder columns, elastomeric contacts and mechanical contacts.

12. The electrical assembly of claim 1, wherein thermally induced dynamic warp is the warp of at least one of the PCB and the attached component resulting from temperature excursions experienced by at least one of the PCB and the attached component in a solder reflow process.

13. The electrical assembly of claim 12, wherein the temperature excursions are provided by a reflow oven used in a reflow process intended to create electrical contacts between a component and PCB by melting solder placed between opposing electrical attach points on the component and the PCB.

14. The electrical assembly of claim 13, wherein the temperature excursions are provided by a reflow oven include both a heating and a cooling cycle.

* * * * *